Feb. 6, 1951  H. F. GRAY  2,540,329
SCROLL SAW ATTACHMENT TO TABLE SAW
Filed March 1, 1950
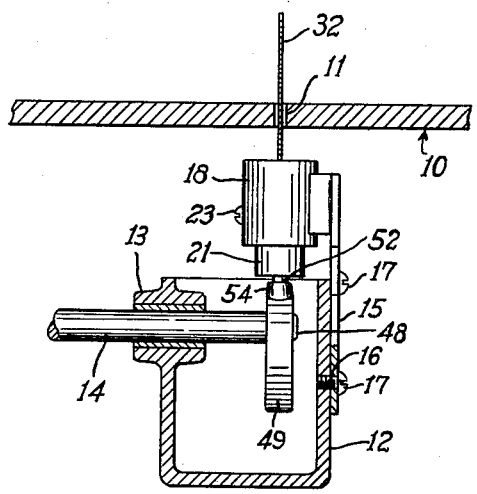
Fig.1
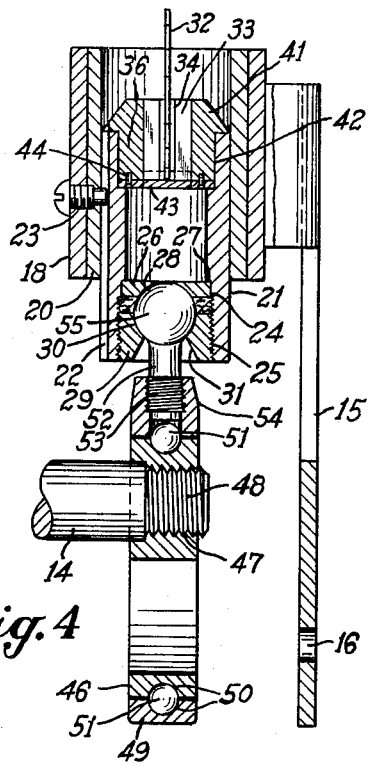
Fig.4
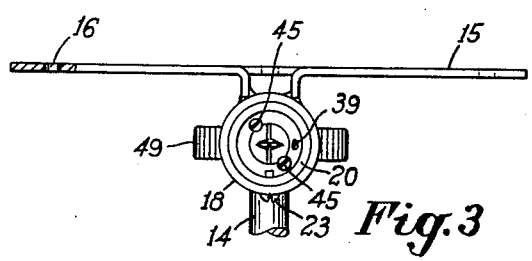
Fig.3
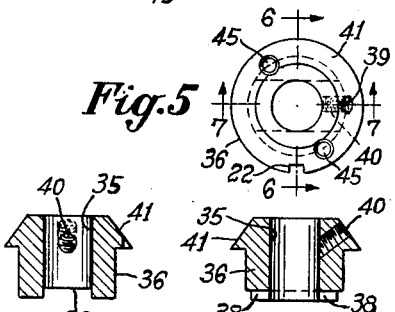
Fig.5
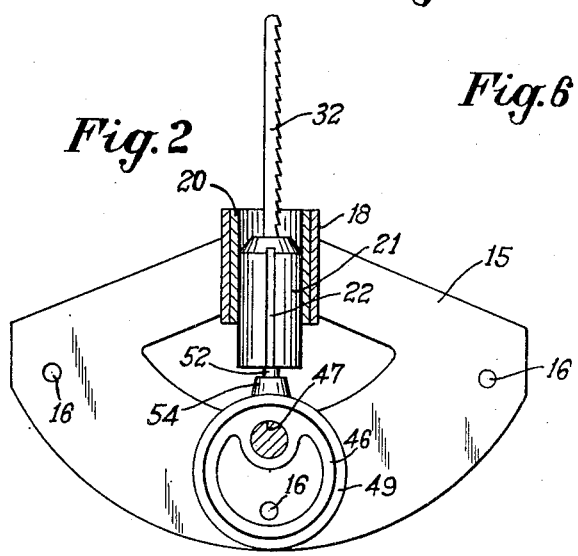
Fig.2
Fig.6
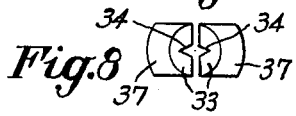
Fig.7
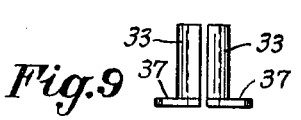
Fig.8
Fig.9
INVENTOR.
Homer F. Gray
BY
Frease and Bishop
ATTORNEYS Patented Feb. 6, 1951

2,540,329

UNITED STATES PATENT OFFICE 2,540,329

SCROLL SAW ATTACHMENT TO TABLE SAW

Homer F. Gray, Salem, Ohio

Application March 1, 1950, Serial No. 147,039

5 Claims. (Cl. 143—72)

The invention relates to saws, and more particularly to a scroll saw attachment adapted to be mounted upon a conventional tilting table bench saw so as to easily and readily convert the same into a scroll saw.

The conventional tilting table bench saw includes a saw casing or housing, beneath the tilting table, an arbor being journalled in said casing and carrying a circular saw blade which extends through a slot in the table.

The present invention contemplates the provision of an attachment which may be easily mounted upon the saw casing of the conventional bench saw and provided with a saber type scroll saw blade, operated by an eccentric which may be easily connected to the arbor after the circular blade has been removed therefrom, whereby the scroll saw blade may be reciprocated through the slot in the table.

The object of the present invention is to provide such an attachment comprising a bracket plate adapted to be attached to the saw casing and having a tubular bearing thereon within which is vertically slidably mounted a piston carrying a saber type scroll saw blade, the piston being operatively connected to an eccentric which is adapted to be mounted upon the arbor of the bench saw in place of the usual circular saw blade.

Another object is to provide such an attachment in which the eccentric is surrounded by an eccentric band having a rigid stud thereon provided with a ball at its upper end swivelled within a socket in the piston.

A further object is to provide a novel clamping means for the saw blade in the upper end portion of the piston.

A still further object is to provide an attachment by means of which the conventional tilting table bench saw may be quickly and easily converted into a scroll saw.

The above objects together with others which will be apparent from the drawing and following description, or which may be later referred to, may be attained by constructing the improved scroll saw attachment in the manner hereinafter described in detail and illustrated in the accompanying drawing, in which:

Figure 1 is a fragmentary, sectional elevation showing the saw casing and arbor and a portion of the table of a bench saw, with the attachment to which the invention pertains mounted thereon;

Fig. 2 an elevation, partly in section, of the saw attachment;

Fig. 3 a top plan view of the saw attachment;

Fig. 4 a vertical, sectional view through the saw attachment;

Fig. 5 a top plan view of the tubular head in which the saw blade clamp is located;

Fig. 6 a section on the line 6—6, Fig. 5;

Fig. 7 a section on the line 7—7, Fig. 5;

Fig. 8 a top plan view of the two clamping members for the saw blade; and

Fig. 9 is a side elevation of the clamping members shown in Fig. 8.

Referring first to Fig. 1, a portion of a tilting table, for a conventional bench saw, is indicated generally at 10, having the usual slot 11 through which the saw blade is adapted to operate. The usual saw casing 12, located below the table, is shown provided with the conventional bearing 13 for the rotary arbor 14 for the conventional circular saw blade which is adapted to extend through the slot 11 of the table.

The present invention consists in a saw attachment by means of which the bench saw may be quickly and easily converted into a scroll saw by removing the conventional circular saw blade from the arbor 14 and mounting the attachment upon the saw casing 12 and operatively connecting the eccentric of the attachment to the arbor 14.

The saw attachment to which the invention pertains comprises a bracket plate 15, having apertures 16 therein to receive screws 17 for attaching the bracket plate to the saw casing 12. A tubular, vertical bearing 18 is formed upon the bracket plate 15 and adapted to overhang the saw casing 12 above the end of the arbor 14.

A bushing 20, of bronze or the like, is preferably located within the tubular bearing 18, and vertically slidably mounted therein is a cylindrical piston 21 having a longitudinal groove 22 in one side to receive the inner end of the set screw 23 so as to prevent rotary movement of the piston within the bushing.

The piston 21 is hollow or tubular and the inner bore thereof is enlarged at the lower end, as at 24, and tapped as at 25, to receive the disc 26 which seats against the shoulder 27 within the piston and is provided with the semi-spherical cavity or socket 28.

The internally tapped lower portion 25 of the piston receives the externally threaded plug 29, having the semi-spherical socket 30 in its upper side communicating with the downwardly flared opening 31 extending through the bottom thereof.

The lower end portion of a saber type scroll saw blade 32 is clamped within the upper end portion of the piston by means of a pair of semi-cylindrical clamping members 33 having opposed V-shaped grooves 34 to receive opposite edge portions of the saw blade.

These clamping members are located within the central bore 35 of the cylindrical head 36 and are provided at their lower ends with outturned flanges 37 received in the recesses 38 in the lower end of the head 36.

The clamping members 33 are clamped together upon opposite edges of the saw blade by the screw 39 located through the angular, tapped bore 40 in the head 36.

A conical flange 41 is formed upon the upper end of the head 36 and adapted to rest upon the upper end of the piston, the remaining portion of the head 36 being received within the enlarged bore 42 in the upper end of the piston. A plate 43 is connected to the lower end of the head 36 as by screw 44. The head is connected to the piston as by screws 45.

The eccentric 46 may be in the form of a disc or ring, having an eccentrically located tapped bore 47 therein, adapted to be screwed upon the threaded end 48 of the arbor 14. The eccentric band 49 surrounds the eccentric 46, and for the purpose of reducing friction, cooperating ball races 50 are formed in the abutting surfaces of the eccentric and eccentric band to receive the balls 51.

A stud 52 is connected to the eccentric band and is preferably provided with the threaded lower end 53 received in the internally threaded boss 54 upon the eccentric band. A ball 55 is formed upon the upper end of the stud 52 and is swivelled in the sockets 28 and 30, of the members 26 and 29 respectively, in the lower end of the piston.

When it is desired to convert the conventional tilting table bench saw into a scroll saw, it is only necessary to remove the circular saw from the arbor 14, mount the eccentric 46 upon the screw threaded end 48 of the arbor and attach the bracket plate 15 to the saw casing 12 by the screws 17.

As the arbor rotates the eccentric and eccentric band through the stud 52, ball 55 and socket in the piston will rapidly reciprocate the piston 21 within the bearing 18 reciprocating the scroll saw blade 32 through the slot 11 in the table.

I claim:

1. As an article of manufacture, an attachment for a table bench saw having a saw casing, an arbor journalled in said saw casing and a table above the saw casing and having a slot therein, said attachment comprising a bracket plate for connection to the saw casing, a vertical bearing carried by the bracket plate, a vertically slidable piston within the bearing, a scroll saw blade carried by the piston for reciprocating motion through the slot in the table, an eccentric for connection to the arbor and means operatively connecting the eccentric to the piston.

2. As an article of manufacture, an attachment for a table bench saw having a saw casing, an arbor journalled in said saw casing and a table above the saw casing and having a slot therein, said attachment comprising a bracket plate for connection to the saw casing, a vertical bearing carried by the bracket plate, a vertically slidable piston within the bearing, a scroll saw blade carried by the piston for reciprocating motion through the slot in the table, an eccentric for connection to the arbor, an eccentric band surrounding the eccentric, a ball carried by the eccentric and means in the piston providing a swivel connection for the ball.

3. As an article of manufacture, an attachment for a table bench saw having a saw casing, an arbor journalled in said saw casing and a table above the saw casing and having a slot therein, said attachment comprising a bracket plate for connection to the saw casing, a vertical bearing carried by the bracket plate, a vertically slidable piston within the bearing, a scroll saw blade carried by the piston for reciprocating motion through the slot in the table, an eccentric for connection to the arbor, and ball and socket means connecting the eccentric to the piston.

4. As an article of manufacture, an attachment for a table bench saw having a saw casing, an arbor journalled in said saw casing and a table above the saw casing and having a slot therein, said attachment comprising a bracket plate for connection to the saw casing, a vertical bearing carried by the bracket plate, a vertically slidable piston within the bearing, a scroll saw blade carried by the piston for reciprocating motion through the slot in the table, clamping means in the upper portion of the piston comprising a tubular cylindrical head having oppositely disposed recesses in its lower end, a pair of semi-cylindrical clamping members located in said head and having opposed V-shape grooves receiving opposite edges of the saw blade, means in the head for clamping said clamping members together and oppositely disposed flanges at the lower ends of the clamping members received in said recesses, an eccentric for connection to the arbor and means operatively connecting the eccentric to the piston.

5. As an article of manufacture, an attachment for a table bench saw having a saw casing, an arbor journalled in said saw casing and a table above the saw casing and having a slot therein, said attachment comprising a bracket plate for connection to the saw casing, a vertical bearing carried by the bracket plate, a vertically slidable piston within the bearing, a scroll saw blade carried by the piston for reciprocating motion through the slot in the table, clamping means in the upper portion of the piston comprising a tubular cylindrical head having oppositely disposed recesses in its lower end, a pair of semi-cylindrical clamping members located in said head and having opposed V-shape grooves receiving opposite edges of the saw blade, means in the head for clamping said clamping members together and oppositely disposed flanges at the lower ends of the clamping members received in said recesses, an eccentric for connection to the arbor, an eccentric band surrounding the eccentric, a ball carried by the eccentric and means in the piston providing a swivel connection for the ball.

HOMER F. GRAY.

REFERENCES CITED

The following references are of record in the file of this patent:

UNITED STATES PATENTS

| Number | Name | Date |
|---|---|---|
| 48,161 | Doane | June 13, 1865 |
| 609,967 | Ladd | Aug. 30, 1898 |
| 1,618,341 | Howland | Feb. 22, 1927 |
| 1,707,097 | Ruschke | Mar. 26, 1929 |
| 2,015,535 | Sacrey | Sept. 24, 1935 |
| 2,122,611 | Kirby | July 5, 1938 |